US010558460B2

(12) United States Patent
Du et al.

(10) Patent No.: US 10,558,460 B2
(45) Date of Patent: Feb. 11, 2020

(54) GENERAL PURPOSE REGISTER ALLOCATION IN STREAMING PROCESSOR

(71) Applicant: QUALCOMM Incorporated, San Diego, CA (US)

(72) Inventors: Yun Du, San Diego, CA (US); Liang Han, San Diego, CA (US); Lin Chen, San Diego, CA (US); Chihong Zhang, San Diego, CA (US); Hongjiang Shang, San Diego, CA (US); Jing Wu, San Diego, CA (US); Zilin Ying, San Diego, CA (US); Chun Yu, Rancho Santa Fe, CA (US); Guofang Jiao, San Diego, CA (US); Andrew Gruber, Arlington, MA (US); Eric Demers, San Diego, CA (US)

(73) Assignee: QUALCOMM Incorporated, San Diego, CA (US)

(\*) Notice: Subject to any disclaimer, the term of this patent is extended or adjusted under 35 U.S.C. 154(b) by 82 days.

(21) Appl. No.: 15/379,195

(22) Filed: Dec. 14, 2016

(65) Prior Publication Data

US 2018/0165092 A1    Jun. 14, 2018

(51) Int. Cl.
*G06F 9/30* (2018.01)
*G06F 9/38* (2018.01)
(Continued)

(52) U.S. Cl.
CPC .......... *G06F 9/30123* (2013.01); *G06F 8/441* (2013.01); *G06F 9/3012* (2013.01);
(Continued)

(58) Field of Classification Search
None
See application file for complete search history.

(56) References Cited

U.S. PATENT DOCUMENTS 6,035,389 A \* 3/2000 Grochowski ......... G06F 9/3836
712/215
6,092,175 A    7/2000 Levy et al.
(Continued)

OTHER PUBLICATIONS

Balasubramonian R., et al., "Dynamically Allocating Processor Resources between Nearby and Distant ILP", Department of Computer Science, Department of Electrical and Computer Engineering, University of Rochester, 2001, pp. 1-12.

*Primary Examiner* — George Giroux
(74) *Attorney, Agent, or Firm* — Shumaker & Sieffert, P.A.

(57) ABSTRACT

Systems and techniques are disclosed for general purpose register dynamic allocation based on latency associated with of instructions in processor threads. A streaming processor can include a general purpose registers configured to stored data associated with threads, and a thread scheduler configured to receive allocation information for the general purpose registers, the information describing general purpose registers that are to be assigned as persistent general purpose registers (pGPRs) and volatile general purpose registers (vGPRs). The plurality of general purpose registers can be allocated according to the received information. The streaming processor can include the general purpose registers allocated according to the received information, the allocated based on execution latencies of instructions included in the threads.

30 Claims, 5 Drawing Sheets

First Example GPR
Allocation Scheme

Second Example GPR
Allocation Scheme [FIGs. 2-4]

(51) Int. Cl.
*G06T 1/20* (2006.01)
*G06F 8/41* (2018.01)

(52) U.S. Cl.
CPC ........ *G06F 9/30141* (2013.01); *G06F 9/3836* (2013.01); *G06F 9/3851* (2013.01); *G06T 1/20* (2013.01)

(56) References Cited

U.S. PATENT DOCUMENTS

| | | | |
|---|---|---|---|
| 6,195,748 B1* | 2/2001 | Chrysos | G06F 9/30101 712/227 |
| 6,549,930 B1* | 4/2003 | Chrysos | G06F 9/4881 718/104 |
| 6,990,567 B1 | 1/2006 | Cohen et al. | |
| 7,516,306 B2* | 4/2009 | Bacon | G06F 8/314 712/219 |
| 8,145,882 B1* | 3/2012 | Kishore | G06F 15/78 712/34 |
| 8,766,995 B2 | 7/2014 | Yu et al. | |
| 8,869,147 B2 | 10/2014 | Du et al. | |
| 8,884,972 B2 | 11/2014 | Du et al. | |
| 2004/0025150 A1* | 2/2004 | Heishi | G06F 8/425 717/154 |
| 2006/0158354 A1* | 7/2006 | Aberg | G06F 8/447 341/50 |
| 2009/0100249 A1* | 4/2009 | Eichenberger | G06F 9/3012 712/42 |
| 2009/0260013 A1* | 10/2009 | Heil | G06F 15/7825 718/103 |
| 2010/0299499 A1 | 11/2010 | Golla et al. | |
| 2012/0159110 A1* | 6/2012 | Wu | G06F 9/3891 711/170 |
| 2013/0111453 A1* | 5/2013 | Kalogeropulos | G06F 8/4452 717/161 |
| 2013/0346729 A1* | 12/2013 | Barowski | G06F 9/3836 712/214 |
| 2015/0154022 A1* | 6/2015 | Khot | G06F 9/30123 712/217 |
| 2016/0004534 A1* | 1/2016 | Padmanabha | G06F 9/3836 712/229 |
| 2017/0278213 A1* | 9/2017 | Eckert | G06T 1/60 |

* cited by examiner

Dynamic vGPR / pGPR Allocation 28

| Thread #9-#15 (1-21) | | | |
|---|---|---|---|
| Thread #8 (22-24) | R0-R2 (P) | | |
| Thread #7 (25-27) | R0-R2 (P) | | |
| Thread #4-#6 (28-36) | | | |
| Thread #3 (37-39) | R0-R2 (P) | | |
| Thread #2 (40-47) | R0-R2 (P) | R3-R7 (V) | |
| Thread #1 (48-55) | R-R2 (P) | R3-R7 (V) | |
| Thread #0 (56-63) | R0-R2 (P) | R3-R7 (V) | 26 |

24 ↑

3 Volatile General Purpose Register Pools shared by all Threads

22 ↗

Second Example GPR Allocation Scheme [FIGs. 2-4]

Static GPR Allocation Scheme 2 — 10

| Thread #8-#15 ( ) | | |
|---|---|---|
| Thread #7 (0-7) | R3-R7 (S) | R0-R2 (L) |
| Thread #4-#6 (8-31) | | |
| Thread #3 (32-39) | R3-R7 (S) | R0-R2 (L) |
| Thread #2 (40-47) | R3-R7 (S) | R0-R2 (L) |
| Thread #1 (48-55) | R3-R7 (S) | R0-R2 (L) |
| Thread #0 (56-63) | R3-R7 (S) 6 | R0-R2 (L) 8 |

4 ↗

First Example GPR Allocation Scheme

GENERAL PURPOSE REGISTER ALLOCATION IN STREAMING PROCESSOR

TECHNICAL FIELD

Embodiments of this disclosure generally relate to electronics, and, in particular, to streaming processors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graphics Processing Units (GPUs) are increasingly being utilized for both (1) graphics processing, and (2) general purpose computing, of which a field known as GPGPU (General-purpose computing on graphics processing units) has been established. A constraint associated with GPUs is the total amount of memory, registers, and so on, that are available for use by threads, or groups of threads operating on a same shader or kernel (e.g., a WARP, a WAVEFRONT). As an example of a kernel (e.g., a compute kernel), a portion of code can be included in a loop, and a multitude of threads can execute the same portion of code in parallel until the loop completes. Accordingly, code that is parallelizable can be sped-up through use of such kernels. Additionally, the portion of code can include a barrier instruction, indicating that code beyond the barrier instruction is not to be executed until all threads in a group of threads (e.g., the multitude of threads) have reached the barrier instruction. Accordingly, the threads in the group of threads can be synchronized, and executions subsequent to the barrier instruction which may depend on computed information prior to the barrier instruction, can be assured to have access to valid information.

SUMMARY

The systems, methods, and devices described herein each have several aspects, no single one of which is solely responsible for its desirable attributes. Without limiting the scope of this disclosure, several non-limiting features will now be described briefly.

One aspect of this disclosure is a streaming processor that includes general purpose registers and a thread scheduler. The general purpose registers are configured to store data associated with a plurality of threads. The general purpose registers comprise a first type of registers, each of the first registers each configured to store data for a dedicated thread of the plurality of threads. The general purpose registers further comprise a second type of registers configured to be allocated among the plurality of threads. The thread scheduler is configured to receive a first instruction having a first latency and a second instruction having a second latency, the latencies being associated with execution of the instructions by the streaming processor, the first latency being above a threshold and the second latency being below the threshold. The thread scheduler is further configured to direct the streaming processor to store data associated with the first instruction to be stored in a general purpose register of the first type based on information associated with the first instruction received at an input of streaming processor. The thread scheduler is further configured to direct the streaming processor to store data associated with the second instruction to be stored in a general purpose register of the second type based on information associated with the second instruction.

Another aspect of this disclosure is a method implemented by a streaming processor. The method includes receiving information identifying an allocation of general purpose registers (GPR) included in the streaming processor, the information indicating registers included in the GPR to be assigned as one of a first type of register or a second type of register; allocating the GPR according to the received information; receiving information identifying a plurality of threads to be executed by the streaming processor, and associating the information with a particular thread identifying assignments of (1) one or more of the first type of registers and (2) one or more of the second type of registers; and executing instructions included in the particular thread, the instructions utilizing the assigned first and/or second types of registers based on respective execution latencies of the instructions.

Another aspect of this disclosure is an apparatus. The apparatus includes means for allocating general purpose registers (GPRs) based on information received at an input of a streaming processor, the GPRs including registers assignable as persistent general purpose registers (pGPRs) or volatile general purpose registers (vGPRs). The apparatus further includes means for executing instructions included in a plurality of threads, the means for executing directing the streaming processor to store data associated with instructions of a plurality of threads in pGPRs or vGPRs based on respective execution latencies of the instructions.

Another aspect of this disclosure is non-transitory computer-readable storage including instructions that, when executed, direct a system of one or more processors to perform operations. The operations include accessing portions of code associated with a plurality of threads, the plurality of threads being executed on a streaming processor; analyzing the portions of code, and determining an allocation of a general purpose registers included in the streaming processor, the allocation specifying that each general purpose register is to be one of, (1) a first type of registers, each of the first registers assigned for dedicated use to a thread of the plurality of threads, (2) a second type of registers assigned for shared use to the plurality of threads; generating information associated with the determined allocation; providing the generated information to the streaming processor.

Additional embodiments of the disclosure are described below in reference to the appended claims, which may serve as an additional summary of the disclosure. For purposes of summarizing the disclosure, certain aspects, advantages and novel features of the inventions have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Although particular embodiments are described herein, other embodiments, including embodiments that do not provide all of the benefits and features set forth herein, will be apparent to those of ordinary skill in the art.

This specification describes multi-threaded streaming processors (e.g., also referred to as streaming processors), which can be, or be included in, graphics processors (e.g., graphics processing units (GPUs)), and efficient allocation of general purpose registers (a group of general purpose registers, hereinafter referred to as a GPR) to threads being executed by a streaming processor. In this specification, a multi-threaded streaming processor (hereinafter referred to as a streaming processor) can be configured to obtain and schedule execution of instructions associated with threads, and can include, or have access to, a group of registers (e.g., general purpose registers). The group of registers can include one or more registers (e.g., a block of general purpose registers, a general purpose register space, a general purpose register footprint) that can store (e.g., temporarily) data associated with execution of the instructions, and can be volatile or non-volatile memory. Additionally, the streaming processor can include one or more arithmetic logic units (ALUs) to perform computations, one or more units associated with memory operations (e.g., the Load Control 112 described below, with respect to FIG. 2), and so on.

A streaming processor (e.g., the streaming processor 100 described below, with respect to FIG. 2) can execute multitudes of threads. Such threads can, in some instances, be grouped together according to particular code (e.g., instructions) and the grouped threads can be executed in parallel. For instance, a group of threads (e.g., a WARP, a WAVEFRONT) can include a particular number of threads, with each thread repeatedly executing a same portion of code (e.g., code identifying instructions, for instance as included in a loop), such as a shader (e.g., instructions associated with rendering an image in specific, unique, ways) or a kernel (e.g., a compute kernel). The streaming processor can execute, in parallel, (1) a multitude of threads and/or (2) a multitude of groups of threads, and the techniques described herein can be applied in any case. As an example, the streaming processor can execute multitudes of groups of threads, with each group of threads corresponding to execution of a respective portion of code. For instance, the streaming processor can interleave between the groups of threads, such that each group can be executed. As another example, the streaming processor can execute multitudes of threads, with each thread corresponding to execution of a respective portion of code. For convenience, the specification refers to a thread as being a particular thread or a group of threads, both associated with execution of a particular portion of code.

In a streaming graphics processor, texture operations can have a relatively long latency. Latency can be a significant aspect of the performance of the streaming graphics processor, and to reduce latency, for example, more memory can be included on the graphics processor. However, including additional memory (e.g., increasing a size of the memory) typically increases cost. A general purpose register (GPR) can store data for a plurality of different threads executing in parallel. GPR size can be traded off with latency of executing the plurality of threads. Balancing the tradeoff between GPR size and latency can be difficult.

Aspects of this disclosure relate to efficient allocation of a GPR. The GPR can include registers that are logically allocated into at least two types of registers. A first type of register can store data associated with longer latency operations. Longer latency operations can be unpredictable and executed in a relatively long number of cycles (e.g., about 200 to 1000 s of cycles in some instances). Load operations, such as loading texture data, are an example of longer latency operations. The first type of registers can be statically allocated to particular threads. A second type of registers can be associated with lower latency operations. The lower latency operations can be executed in less than 100, 20, or 10 cycles, for example. As an illustrative example, an arithmetic logic unit (ALU) operation can be a lower latency operation. The second type of registers can be dynamically allocated to various threads as desired. While the first and second types of registers can be implemented by similar or the same circuitry, these types of registers are logically different from each other and treated differently by the streaming processor.

As will be described in more detail below, the streaming processor can assign each thread a portion of a group of general purpose registers (GPR) (e.g., a portion of accessible general purpose registers, hereinafter referred to as a GPR), such that the thread can temporarily store information for use in executing instructions. For instance, a thread may include one or more arithmetic instructions, and the streaming processor can store intermediate results associated with execution of the arithmetic instructions in one or more registers. Similarly, the thread may include one or more instructions associated with loading information from memory (e.g., random access memory, hard drive or solid state memory), for use by instructions in the thread, and the streaming processor can store the loaded information in one or more registers. Accordingly, threads may have quick access to desired information through use of registers.

To ensure that the GPR is efficiently (e.g., optimally) used, the GPR can be separated into registers of a first type, referred to herein as a persistent general purpose register (pGPR), and registers of a second type, referred to herein as a volatile general purpose register (vGPR). As described above, each thread can be assigned one or more pGPRs (e.g., sole use of the pGPRs, which can store data persistently for each thread, for instance across stopping conditions such as barrier instructions as described further below), and the pGPRs can be utilized for instructions associated with latencies greater than a first threshold (e.g., 500 cycles, 1000 cycles, 3000 cycles, or 10,000 cycles), such as loads or stores from memory external to the streaming processor (e.g., outside memory, for instance random access memory). Additionally, all threads, or a subset of threads, may be assigned the same one or more vGPRs, and the vGPRs can be utilized for instructions associated with latencies less than a second threshold (e.g., less than the first threshold, less than 100 cycles, or less than 50 cycles), such as arithmetic instructions, floating point instructions, execution unit instructions, etc. The vGPRs of the GPR can be assigned to two or more threads concurrently.

As an example, and as will be further described below with respect to FIG. 1, the streaming processor may be executing 16 threads, and each of the 16 threads may be assigned (e.g., for sole use by the thread) a same number of pGPRs. These pGPRs can be statically assigned to each respective thread, such that information can be maintained in the pGPRs for use by the respective thread. Each of the 16 threads may be assigned a same number of vGPRs, with a particular number of the 16 threads (e.g., 5 threads or 6 threads) sharing the same vGPRs. The streaming processor can enable use of particular vGPRs by a particular thread. The particular thread can have sole use of the particular vGPRs, and thus execute instructions and store data in the vGPRs, until a stopping condition is reached. Subsequent to the stopping condition, the streaming processor can enable use of the particular vGPRs by a different thread. While the particular thread can have sole use of the particular vGPRs until a stopping condition, the particular thread can additionally have sole use of the pGPRs across stopping conditions, for instance the pGPRs can be statically assigned to each thread. An example of a stopping condition includes a barrier instruction being reached by the thread (e.g., an instruction indicating that the thread is not to execute instructions beyond the barrier instruction without a portion of code prior to the barrier instruction being implemented). As an example, for a group of threads, the barrier instruction can ensure that all threads in the group of threads have fully implemented a same portion of code prior to the barrier instruction.

The streaming processor can dynamically assign and/or de-assign use of vGPRs by each thread, and can store instructions from a de-assigned thread in a queue. The de-assigned thread can, at a later point (e.g., upon a stopping condition reached by an assigned thread), be assigned use of vGPRs and its instructions can be implemented (e.g., from the queue). Accordingly, the streaming processor can enable relatively rapid use of limited vGPRs through efficiently switching between the threads. Furthermore, since each thread can be assigned its own pGPRs, slower instructions (e.g., loads or stores to memory external to the streaming processor) can maintain information specific to the thread as desired, and across stopping conditions (e.g., barrier instructions), while faster instructions can utilize dynamically assigned vGPRs. Accordingly, a limited GPR can accommodate a larger quantity of threads, and enable a more efficient use of the registers.

As will be described, a compiler can analyze code to be executed by the streaming processor, and can determine an allocation of a GPR, including a particular number of pGPRs per thread and/or a particular number of vGPRs to be shared by the threads. As an example, the compiler may identify a frequency of particular operations, such as memory instructions (e.g., loads or stores), and can determine a number of pGPRs for each thread. In some instances, the compiler may determine that one or more threads are to be assigned a greater number of pGPRs than other threads, and can efficiently determine the allocation of the GPR. The streaming processor can receive information indicating the allocation, and allocate, or cause allocation of, the GPR according to the received information.

Particular embodiments of the subject matter described in this specification can be implemented so as to realize one or more of the following advantages, among others. General purpose registers included in multi-threaded streaming processors can be efficiently utilized, and registers can be optimized through dynamic allocation and de-allocation of the registers. As will be described, a general purpose registers (e.g., a group of general purpose registers, herein referred to as a GPR) can be split into two or more different types of registers. For example, the GPR can include a (1) first register type—referred to as a persistent GPR—being associated with instructions that have relatively long life times/cycles (e.g., loads, stores, such as loading texture data from memory), and with a (2) second register type—referred to as a volatile GPR—being associated with instructions that have relatively short life times/cycles (e.g., arithmetic operations, logic operations, such as ALU operations, operations associated with thread execution, such as EFU operations, and so on). Each thread, or group of threads, being executed by a multi-threaded steaming processor can be assigned sole use of one or more persistent GPRs ('pGPRs'), and assigned shared use of volatile GPRs ('vGPRs') with other threads, or groups of threads.

Since each thread can, in general, be executed in less time when using vGPRs (e.g., a vGPR can store an intermediary temporary value from an ALU operation for tens of cycles), the threads can advantageously make use of the same vGPRs through efficient queueing of instructions and allocation of the vGPRs. As an example, a thread, or group of threads, can be assigned one or more vGPRs until execution of a barrier instruction, at which point the one or more vGPRs can be reassigned to a different thread, or group of threads, for instance according to a queue. Accordingly, the GPR can accommodate a greater number of threads, or groups of threads, for instance 40%, 50%, 60%, and so on, greater threads, or groups of threads, based on previous GPR schemes. Additionally, for a given quantity of threads or groups of threads, a GPR can be reduced in size, for instance reduced in quantity of registers, and thus causing savings in cost and area, while still enabling the same performance as previous GPR schemes, such as latency coverage, streaming processor utilization, and so on.

Figure 1:
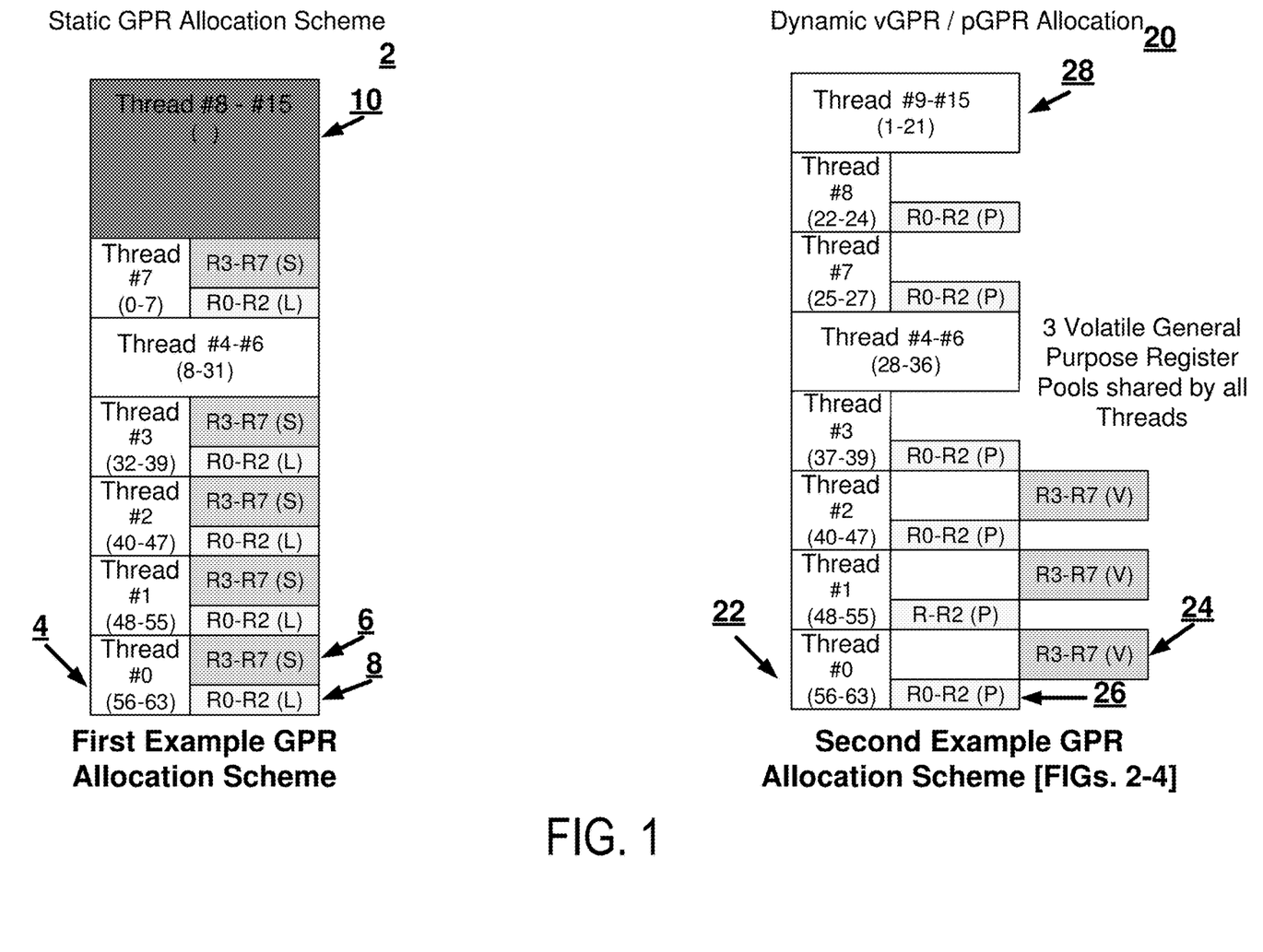
FIG. 1 illustrates a first example general purpose register (GPR) allocation scheme and a second example GPR allocation scheme.

FIG. 1 illustrates a first example general purpose register (GPR) allocation scheme (2) and a second example GPR allocation scheme (20). Each GPR illustrated in FIG. 1 is an example of registers accessible to a streaming processor (e.g., the streaming processor 100 described below, with respect to FIG. 1). The GPR can include any suitable number of registers, for instance 64 registers as illustrated. The GPR can be quickly accessible storage for use by threads being executed by the streaming processor. In some instances, a compiler can allocate each GPR according to either the first or second scheme, and a user of the compiler can request the allocation at, for instance, the time of compiling.

The first example GPR allocation scheme (2) includes eight threads (e.g., threads #0-#7 as illustrated) that have each been statically assigned registers for their use. For instance, thread #0 (4) has been assigned eight registers, with three long registers (8) being utilized for instructions in thread #0 (4) with greater than a threshold latency (e.g., load, stores, and so on), and five short registers (6) being utilized for instructions in thread #0 (4) with lesser latencies (e.g., arithmetic operations). As an example, an instruction in thread #0 (4) can cause the streaming processor to fetch information from memory, and store the fetched information in a long register (8). A different instruction in thread #0, for an instruction associated with an execution latency lower than the instruction to fetch information, can perform computations using the fetched information, and intermediate results can be stored in one or more short registers (6). While in the example of FIG. 1, the GPR in the first example GPR allocation scheme (2) is illustrated with short registers (6) and long registers (8), each thread can be assigned general registers that can be utilized by any instruction in the thread in some instances.

As illustrated in FIG. 1, the GPR in the first example GPR allocation scheme (2) includes 64 registers (e.g., there are eight threads, with each thread being assigned eight registers). Threads #8-#15 (10) cannot be assigned any registers (e.g., all 64 registers have been assigned). Accordingly, some of the registers can be wasted. Through a more efficient allocation of the GPR, the streaming processor can execute a greater number of threads using a GPR of the same size.

The second example GPR allocation scheme (20), which will be described in more detail below with respect to FIGS. 2-4, allocates registers to threads according to, in some implementations, latency associated with instructions that are to be executed by the streaming processor. As illustrated in FIG. 1, each thread (e.g., threads #0-#15) has been assigned three persistent general purpose registers (pGPRs). These pGPRs can be assigned by a thread scheduler (e.g., the thread scheduler 102 described below) included in the streaming processor. Additionally, the threads can share three volatile general purpose register pools (vGPRs), which as described above, can be utilized by threads to store and access information associated with instructions that have lower latency (e.g., arithmetic operations, and so on). In contrast to the first example GPR allocation scheme (2), the second example GPR allocation scheme (20) can accommodate twice as many threads being executed by the streaming processor.

The second GPR allocation scheme 20 can execute threads with reduced latency with the same size GPR compared to first the GPR allocation scheme 2. The second GPR allocation scheme 20 can execute threads with the same latency as the first GPR allocation scheme 2 using a smaller sized GPR than the first GPR allocation scheme 2.

The second example GPR allocation scheme (20) can be determined, for instance, based on a compiler analyzing instructions included in the threads (e.g., threads #0-#15), and determining a quantity of pGPRs that are to be assigned to each thread based on the analysis. For example, the compiler can base the determination of the quantity of pGPRs on a quantity, or frequency, of instructions with latencies (e.g., execution latencies) greater than a threshold (e.g., 500 cycles, 1000 cycles, user-selectable quantity of cycles). Since these instructions will take a relatively longer amount of time (e.g., processor cycles) to execute, the compiler can increase a number of pGPRs depending on the quantity or frequency of their execution.

In some instances, each thread may be assigned a same quantity of pGPRs as a constant, regardless of instructions included in the threads. For instance, a portion of (e.g., a particular percentage of available) registers included in a GPR may be assigned as being pGPRs. Each thread can therefore be assigned a same quantity of pGPRs. For instance, each thread can be assigned a number equivalent to a total quantity of pGPRs divided by a total quantity of threads. In some instances, substantially the same quantity of pGPRs can be assigned to different threads or one or more threads may be assigned an additional pGPR as compared to one or more other threads. The portion of registers assigned as pGPRs may be based on total quantity of threads. As an example, for a first threshold number of threads, a portion of registers assigned as pGPRs may be smaller than for a second, greater, threshold number of threads. Each thread may be assigned a same number of pGPRs regardless of a total quantity of threads. For example, each thread may be assigned 2, 3, 4, pGPRs, up to a threshold quantity of threads.

Alternatively or additionally, the compiler, or an outside system, can monitor execution of threads in streaming processors (e.g., streaming processors the same as, or similar to, the streaming processor 100 described below), and can determine a particular number of pGPRs to be assigned to each thread (e.g., an average number, representing a best guess). As an example, for any increase in quantity of pGPRs assigned to each thread, the total quantity of threads that the streaming processor can accommodate can be reduced (e.g., an increase in quantity of pGPRs assigned to each thread can reduce a total available quantity of registers for additional threads). Thus, the compiler or an outside system can determine the particular number of pGPRs that can (1) enable efficient operation of each thread (e.g., enable each thread to obtain and store information in pGPRs as desired without unduly waiting for free pGPRs), and/or (2) accommodate the maximum number of threads (e.g., the number of accommodated threads can be balanced against the quantity of pGPRs assigned to each thread).

The complier, or an outside system, can determine a quantity of pGPRs to be assigned to threads according to the quantity, or frequency, of instructions included in the threads with latencies greater than the threshold. The complier, or an outside system, can determine clusters of threads according to quantity, or frequency, of instructions with high latencies, and each cluster can be associated with a particular number of pGPRs determined to be the best compromise. The compiler can analyze code to be executed by threads and determine a cluster that comports with the analysis (e.g., determine a closest cluster based on instructions with high latencies included in the code being analyzed). Accordingly, the compiler can quickly analyze code, and identify the quantity of pGPRs to be assigned to each thread according to previously determined clustering techniques (e.g., k-means clustering, which can cluster according to features associated with quantities or frequencies of instructions with high latencies).

In some instances, each thread in the second example GPR allocation scheme (20) can be assigned a unique quantity of pGPRs, for instance according to instructions each thread will be executing. For example, thread #0 (22) may be assigned a particular number of pGPRs (e.g., by the compiler), while a different thread (e.g., thread #1) may be assigned a lesser or greater quantity of pGPRs depending on a quantity, or frequency, of instructions with latencies above a threshold. Thus, registers included in the GPR can advantageously be assigned to threads according to need (e.g., a need estimated by the compiler, for instance based on analyzing code and/or utilizing machine learning techniques).

Based on the determined quantity of pGPRs, the compiler can allocate the remainder of the registers as being vGPRs. As illustrated in the example of FIG. 1, three pools of vGPRs (e.g., vGPR pool (24)) are assigned for use by the threads. In some instances, each thread may access any vGPR (e.g., any register included in a pool of vGPRs), or each thread may be assigned one or more vGPRs (e.g., thread #0 may be assigned use of one or more vGPRs in vGPR pool (24)). For an instruction in a thread that is to utilize one or more vGPRs (e.g., an arithmetic instruction), the instruction may be placed in a queue if (1) no vGPRs are available (e.g., all vGPRs are presently assigned for use by other threads), or (2) no vGPRs assigned to the thread are available (e.g., one or more other threads assigned to the vGPRs are presently utilizing the vGPRs, or are presently assigned sole use of the vGPRs). The instruction can, at a later point, be executed from the queue and utilize one or more vGPRs.

As will be described in more detail below, the compiler can compile instructions included in threads such that the instructions will utilize pGPRs or vGPRs assigned to the threads in some instances. For instance, when compiling an arithmetic instruction, the compiler can indicate that operands included in the arithmetic instruction are to utilize (e.g., store information into or access information from) particular assigned vGPRs (e.g., identifiers or addresses associated with the vGPRs). Accordingly, the processor can, in some implementations, be an off the shelf processor, and the compiler can cause the efficient allocation of the GPR.

Alternatively or additionally, the streaming processor can maintain information associated with each thread that can include identifiers associated with pGPRs assigned to each thread (e.g., register slot IDs, register addresses, and so on), and identifiers associated with vGPRs assigned to each thread along with an indication of whether the assigned vGPRs are available for use (e.g., a valid bit, which the streaming processor can toggle on or off depending on the assigned vGPRs availability). Accordingly, particular registers included in the GPR can be allocated according to information received from, for instance, the compiler, and the streaming processor can easily implement the allocation without any, or substantial, hardware or software revisions to the streaming processor.

Figure 2:
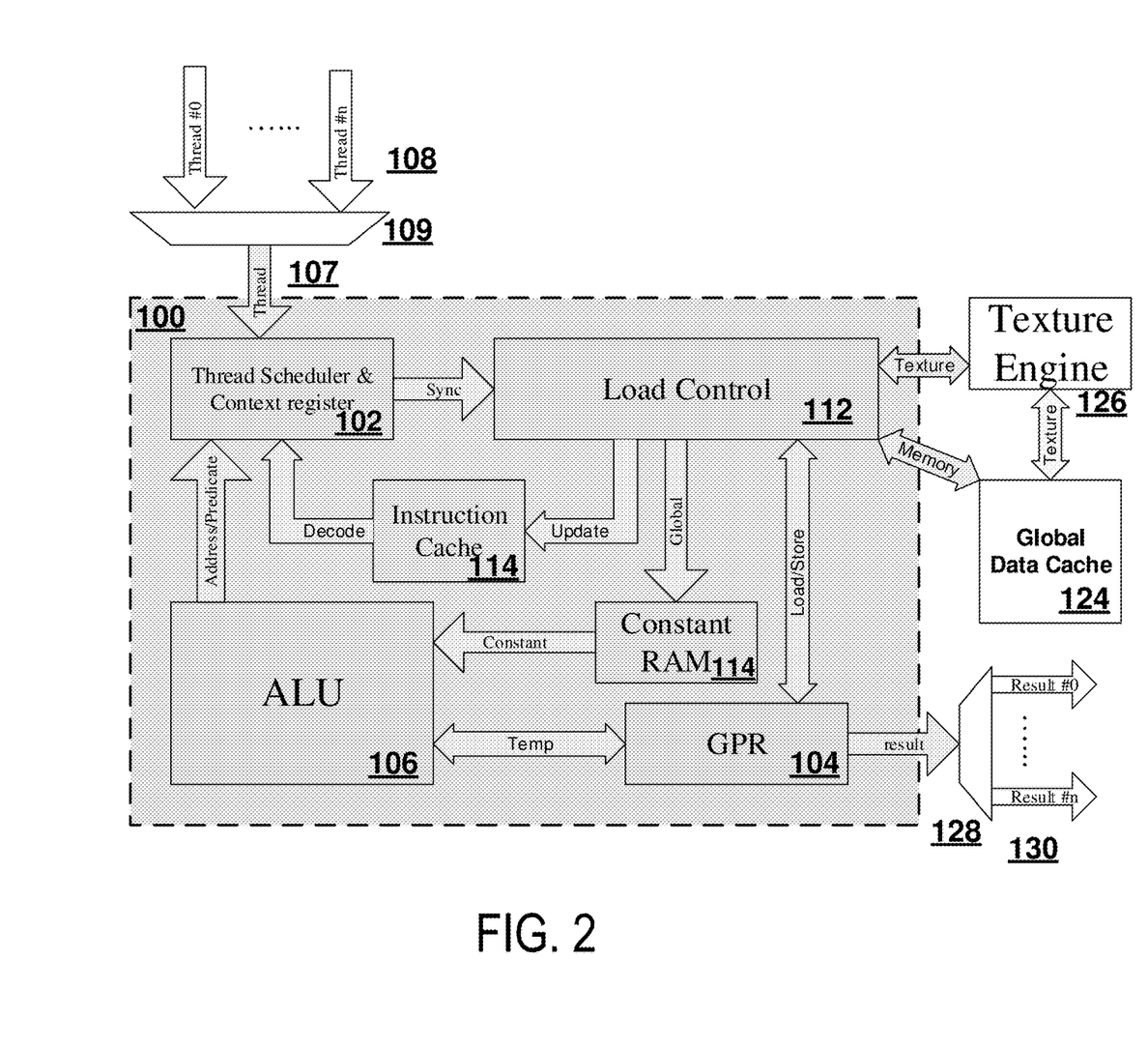
FIG. 2 illustrates an example streaming processor that includes a group of general purpose registers (GPR).

FIG. 2 illustrates an example streaming processor 100 that includes a group of general purpose registers (GPR) 104. The streaming processor 100 is implemented by electronic hardware. As described above, the streaming processor 100 is an example of a streaming processor included in a graphics processing unit, and can be one of a multitude of such streaming processors. Additionally, the streaming processor 100 can execute a multitude of threads (e.g., threads 108), for instance in parallel using a multitude of compute units (e.g., execution units), with each thread being a group of threads, such as a WARP or a WAVEFRONT. As will be described, a compiler can compile code (e.g., sets of instructions), and analyze the code to determine an allocation of the GPR 104, with a first portion of the GPR 104 being persistent general purpose registers (pGPRs), and with a second portion of the GPR 104 being volatile general purpose registers (vGPRs). As described above, the pGPRs can be utilized by each thread for instructions associated with greater than a threshold execution latency, such as memory operations (e.g., loads, stores, such as loading texture samples), and the vGPRs can be utilized by threads for instructions associated with less than the threshold execution latency, such as arithmetic, logic, and so on, operations.

As described above, the streaming processor 100 can execute threads 108, with the threads 108 including instructions specified in code, such as shader code or kernel code (e.g., compute kernels). Each of the threads 108 can be associated with a respective portion of code, and as described above, each thread can be a group of threads that execute a same portion of code in parallel (e.g., the group of threads can be executed by respective execution units included in the streaming processor 100). Accordingly, for code that is parallelizable, the streaming processor 100 can increase a speed at which the code is executed.

As described above with respect to FIG. 1, to accommodate a greater quantity of threads for execution by the streaming processor 100 with the same sized GPR 104, a compiler can determine an allocation of the GPR 104 with respect to pGPRs and vGPRs. As will be described below, with respect to FIG. 3, the compiler can analyze code associated with the threads 108, and determine a quantity, or frequency, of instructions that are associated with greater than a threshold execution latency (e.g., memory operations, such as a memory operation to obtain texture data from random access memory). The compiler can then determine a quantity of pGPRs to be assigned to each thread, such that the instructions included in the threads 108 can utilize pGPRs without unduly waiting for an available pGPR. The remaining registers in the GPR 104 can be assigned as vGPRs, and as will be described, the vGPRs can be demarcated into two or more vGPR pools, and each of the threads 108 assigned to one of the vGPR pools.

As an example of determining a quantity of pGPRs for each thread by the compiler, an example thread may include an instruction to fetch information from memory and store the information in two registers. For the example thread, two assigned pGPRs may suffice, however if a subsequent instruction fetches additional information from memory, for use in computing a value from the additional information and the information in the two registers, then the example thread may have to temporarily store the additional information in a vGPR as its assigned pGPRs are full. Since, as described above, the vGPRs can be shared with other threads, and are meant for quick instructions and dynamic assignment between threads, the example thread will lock up use of the vGPR while waiting for the additional information to be fetched, and when fetched, a result of the computation can ultimately be obtained. The compiler can determine that the example thread should be assigned three pGPRs, such that the fetched information from memory can be stored in assigned pGPRs, and the computation instruction can quickly access the fetched information, and temporarily store the computed value in a vGPR. Accordingly, the example thread will not lock up use of the vGPR for longer than is desired, and utilize the vGPR for the quick computation instruction.

The compiler can provide allocation information to the streaming processor 100 (e.g., to one or more pins of the streaming processor 100), and the streaming processor 100 can allocate the GPR 104 according to the allocation information. For instance, the allocation information can indicate a quantity of pGPRs for each thread, and a quantity of vGPRs to be shared between the threads 104. In some instances, the allocation information can indicate a number of pools of vGPRs (e.g., three pools of five registers), and each thread can be assigned to one of the pools of vGPRs. In some instances, the allocation information can indicate a contiguous logical block of registers in the GPR 104 to be assigned as pGPRs, and a contiguous logical block of registers in the GPR 104 to be assigned as vGPRs. The streaming processor 100 can include any suitable registers to store information associated with GPR allocation. Such registers can store information to implement any features of the mappings associated with FIG. 2. The registers with allocation information can be included in the thread scheduler 102.

The thread scheduler 102 can implement (1) scheduling sequences of instructions to execute and (2) processing of instructions including. The thread scheduler 102 can be modified to implement the GPR allocation scheme 20 of FIG. 1 relative to a similar thread scheduler configured to implement the first GPR allocation scheme 2 of FIG. 1. The thread scheduler 102 of the streaming processor 100 can assign each of the threads 108 to one or more pGPRs according to the allocation information, and may store information identifying the assignment (e.g., for instance, in one or more context registers associated with each thread). Additionally, the streaming processor 100, for instance the thread scheduler 102, can store information, for instance in context registers associated with the threads 108, identifying one or more vGPRs, or a pool of vGPRs, that each thread is assigned. That is, the streaming processor 100, for instance the thread scheduler 102, can associate information with each thread that identifies (1) assigned pGPRs, (2) assigned vGPRs, (3) a vGPR valid bit indicating whether the assigned vGPRs are available for use by the thread, or any suitable combination thereof. As described above, the information associated with each thread can be stored in context registers associated with the thread, the context registers specifying the identifier information (e.g., assigned pGPRs, assigned vGPRs, a vGPR valid bit, and so on).

The streaming processor 100 can then begin to execute instructions included in the threads 108. For instance, the threads 108 can be received at an input interface (e.g., multiplexer 109) that multiplexes the threads 108 into a thread stream 107. The thread scheduler 102 can receive the thread stream 107 and performs various functions to schedule and manage execution of threads 108. For example, the thread scheduler 102 may schedule processing of threads 108, determine whether resources desired by a particular thread are available, cause access to the GPR 104, for instance via load control 112 (e.g., the thread scheduler 102 can interface with load control 112 to synchronize resources for the threads 108), and so on.

The thread scheduler 102 can select active threads for execution, check for read/write port conflicts among the selected threads and, if there are no conflicts, send instruction(s) for one thread into an ALU 106 and sends instruction(s) for another thread to load controller 112. At the request of the thread scheduler 102, the load controller 112 may also obtain data associated with a thread (from texture engine 126) and instructions associated with the thread from an external source (e.g., global data cache 124 and/or an external memory device, and so on). In addition to issuing fetch requests for missing instructions, load control 112 can load thread data into the GPR 104 and associated instructions into instruction cache 114. The thread scheduler 102 can also remove instructions that have been processed by ALU 106.

The ALU 106 can be any suitable ALU. The ALU 106 may be a single quad ALU or four scalar ALUs. As an example, the ALU 106 may perform pixel-parallel processing on one component of an attribute for up to four pixels. Alternatively, the ALU 106 may perform component-parallel processing on up to four components of an attribute for a single pixel. The ALU 106 can fetch data from the GPR 104 and receive constants from constant RAM 114. The ALU 106 can process data at every clock cycle (or nearly every clock cycle) so that it is not idle, thereby increasing processing efficiency. The ALU 106 can also include multiple read and write ports on a bus to the GPR 104 so that it is able to write out thread results while new thread data is fetched/read on each clock cycle.

The thread scheduler 102 can dynamically assign use of vGPRs to particular threads as desired. As described above, the thread scheduler 102 can maintain information indicating one or more vGPRs, or a pool of vGPRs, that are assigned to each thread. As the thread scheduler 102 receives instructions from the threads 108, the thread scheduler can dynamically assign use of one or more vGPRs, or a pool of vGPRs, to threads as desired. For instance, a first example thread may include arithmetic instructions, and the thread scheduler 102 can access information identifying vGPRs assigned to the first example thread, and enable the first example thread to utilize the identified vGPRs.

As described above, the first example thread may utilize the vGPRs until a stopping condition is reached. An example stopping condition includes a barrier instruction, an SY instruction or bit (e.g., describing an SY block), an end instruction, or the like. Once the stopping condition is reached, the thread scheduler 102 can de-assign the first example thread use of the vGPRs (e.g., the thread scheduler 102 can toggle off a vGPR valid bit), and a different may thread may be dynamically assigned use of the vGPRs.

A barrier instruction or a SY bit that is ready to run may not be a stopping condition at run time. For instance, a thread that is waiting for something can be a candidate to switch out and, for example, only when there is such a need (e.g., another thread requests use, or a use is determined, for vGPR(s)) will the thread actually switch out (e.g., be de-assigned use of the vGPR(s)).

Once the thread scheduler 102 dynamically assigns use of vGPRs to a thread, the thread scheduler may indicate that the vGPRs are in use, and toggle a vGPR valid bit off for any thread that is assigned the same vGPRs. Accordingly, if a different thread assigned the same vGPRs includes an arithmetic instruction, the thread scheduler 102 may store the instruction in a queue, or otherwise re-order execution of the different thread until the vGPRs are available.

In some instances, the thread scheduler 102 may determine that a thread is to utilize the vGPRs based on information received at an input of the streaming processor 100, such as a type of instruction included in the thread (e.g., an arithmetic instruction), a bit specifying a GPR type provided with the instruction, based on one or more operands included in the instruction, the like, or any suitable combination thereof. For instance, the thread scheduler can analyze the operands and determine whether the operands references a register in the GPR 104 assigned as a vGPR. As described above, optionally the compiler may cause particular instructions (e.g., arithmetic instructions) to store results or other information in one or more vGPRs. Accordingly, the thread scheduler 102 can analyze an operand, and identify whether a register associated with the operand has been assigned as a vGPR. Since the thread scheduler 102 received allocation information from the compiler, and allocated the GPR 104 accordingly, the thread scheduler 102 can utilize the allocation information to identify operands associated with the vGPRs.

Upon instructions being implemented, thread scheduler 102 can direct outputs. For instance, thread scheduler 102 can identify which thread is being processed by ALU 106, and which registers in the GPR 104 are used to store each ALU 106 result. Thread scheduler 102 can then direct load control 112 to read-out buffered results from the GPR 104 to an output interface (e.g., demultiplexer 128) so that thread results 130 are outputted.

Figure 3:
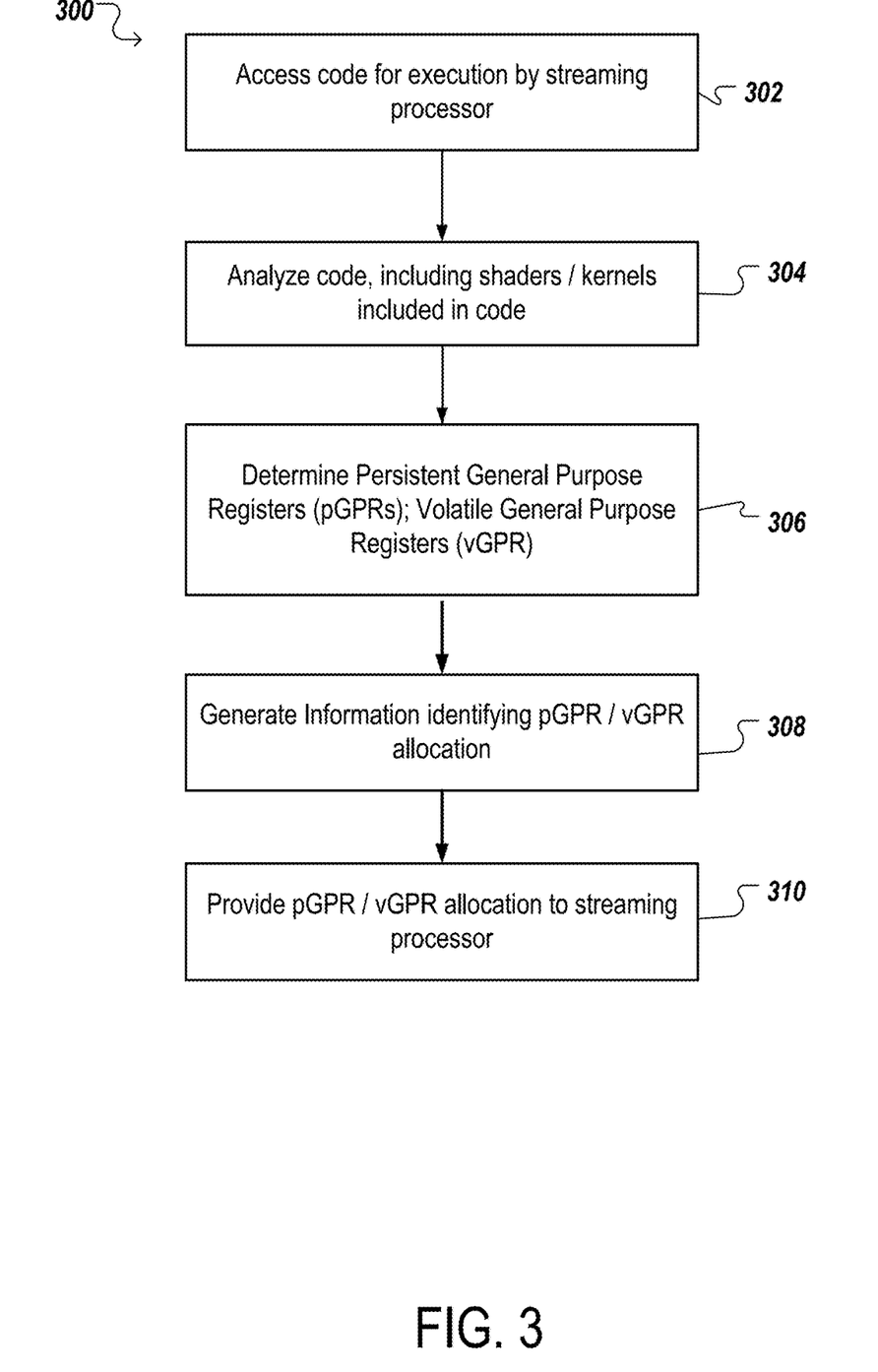
FIG. 3 is a flowchart of an example process for providing allocation information to a streaming processor.

FIG. 3 illustrates an example process 300 for providing allocation information to a streaming processor. For convenience, the process 300 will be described as being performed by a compiler executing on a system of one or more processors.

The compiler accesses code for execution by a streaming processor (block 302). As described above, code can be written for (1) graphics processors, for instance shaders and/or (2) general purpose computing, for instance compute kernels. The compiler can access the code, and as will be described, determine allocation information associated with a group of general purpose registers (GPR) in the streaming processor.

The compiler analyzes the code (block 304). As described above, particular instructions included the code may take longer to execute than other instructions, and the compiler can determine a count or frequency of these instructions. For instance, the compiler may analyze a portion of code that is to be executed by a thread, or executed by threads included in a group of threads, and identify the occurrences of memory operations. The compiler can determine one or more of, an overall occurrence of such long executing instructions (e.g., a total quantity of instructions), a percentage of instructions included in the portion that correspond to the long executing instructions, a frequency of occurrence of the instructions (e.g., a memory operation appears every 3, 5, 10, 20, instructions), a variance associated with the occurrence of the instructions, and so on. The compiler can analyze the code for all threads, or groups of threads, and as will be described, can determine a quantity of persistent general purpose registers (pGPRs) to be assigned to each thread.

The compiler determines an allocation of pGPRs and vGPRs for the GPR (block 306). The compiler can access information identifying information associated with the GPR, for instance a total quantity of registers, a layout of the GPR (e.g., the GPR may be arranged as an array), etc. As described above, the compiler can determine the allocation such that all threads (e.g., the threads identified in block 304) can be accommodated by the streaming processor, while overall performance of the threads is balanced.

As described above, the compiler can access information, based on the quantity or occurrence of instructions with greater than a threshold latency, a number of pGPRs that are to be assigned to each thread. The number can be determined using one or more machine learning models (e.g., k-means clustering as described above, which can be based on simulating code), or the number can be a constant (e.g., the compiler can have stored information identifying the particular number) which can be based on an average quantity or frequency of such instructions included in the threads. In some instances, the allocation information can indicate unique quantities of pGPRs per thread, such that threads which include a greater number of, for example, memory operations, can be assigned more pGPRs.

Upon determining the total quantity of pGPRs to be assigned in the GPR, or a percentage of the GPR that is to be assigned as pGPRs, the compiler assigns the remainder of the GPR as vGPRs. As described above, the compiler can determine pools of vGPRs, for instance creating 2, 3, 4, pools of vGPRs out of the remainder of the GPR. The number of pools can be based on a total quantity of threads in some instances. Accordingly, each thread can be assigned a pool of vGPRs, and use of a pool of vGPRs can be dynamically assigned/de-assigned to threads as described above.

The compiler generates allocation information to be provided to the streaming processor (block 308). As illustrated in FIG. 2, with respect to allocation information, the compiler generates information describing the allocation of the GPR, and the streaming processor can assign threads to pGPRs and vGPRs accordingly (e.g., as will be described below with respect to FIG. 4). For instance, the compiler can access information describing the GPR (e.g., a total number of registers), and can determine the allocation information according to the accessed information.

The compiler provides the generated allocated information to the streaming processor (block 310). The compiler can provide the allocation information to the streaming processor, for instance prior to, or in combination with, the streaming processor receiving threads (e.g., threads 108). As described above, and further described below with respect to FIG. 4, the streaming processor can assign pGPRs and/or vGPRs to each thread according to the allocation information.

Figure 4:
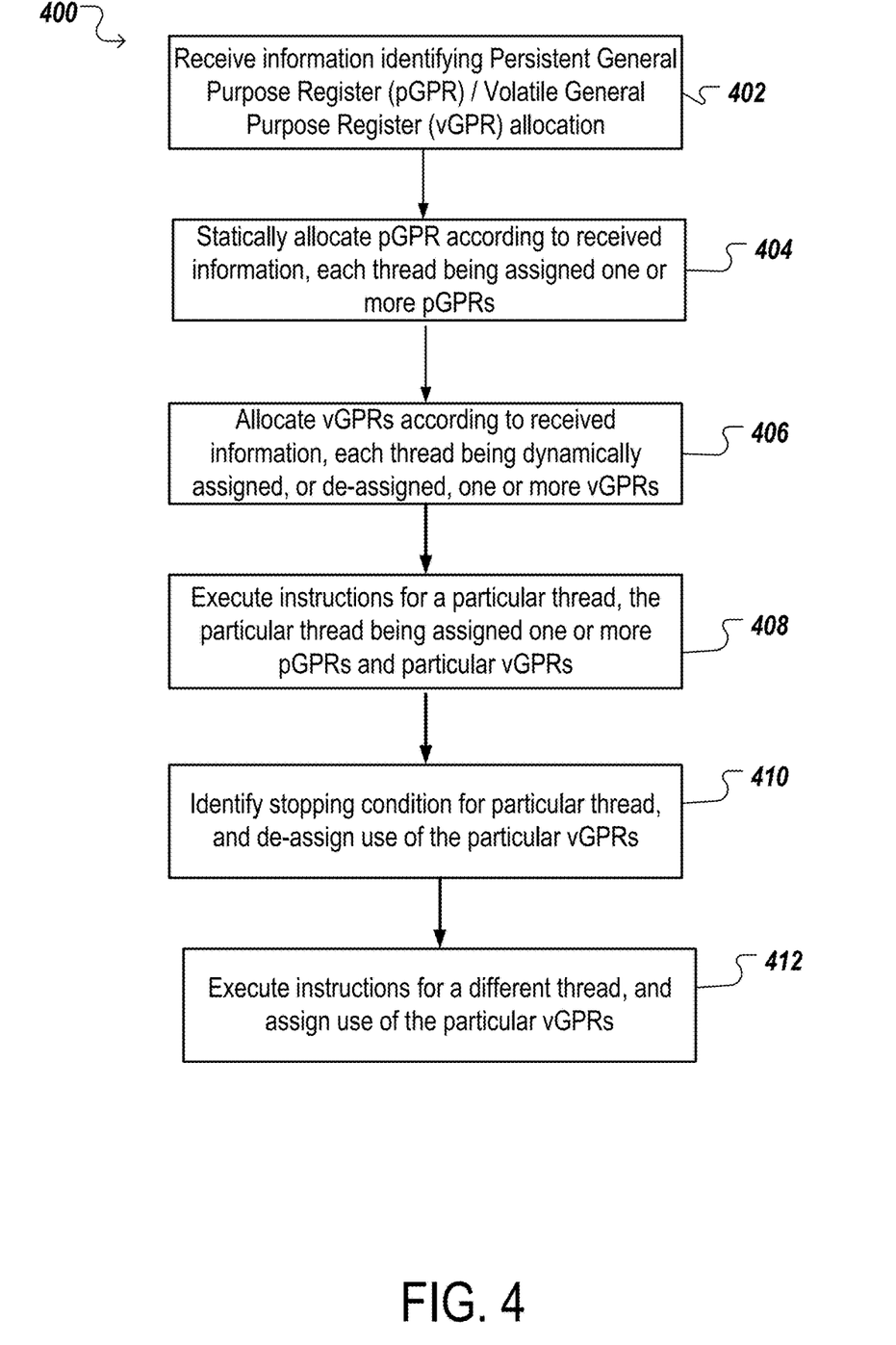
FIG. 4 is a flowchart of an example process for executing threads using general purpose registers assigned based on latency of instructions.

FIG. 4 is a flowchart of an example process 400 for executing threads using general purpose registers assigned based on latency of instructions. For convenience, the process 400 will be described as being performed by a streaming processor (e.g., the streaming processor 100, for instance performed by the thread scheduler 102 included in the streaming processor 100).

The streaming processor receives allocation information (block 402). As described above, a compiler can analyze code, and determine allocation information identifying an allocation of general purpose registers included in a group of general purpose registers (GPR) of the streaming processor. The allocation information can identify a quantity of GPRs that are to be statically assigned to threads, referred to as persistent general purpose registers (pGPRs) as described above, and GPRs that are to be shared by the threads, referred to as volatile general purpose registers (vGPRs) as described above.

The streaming processor allocates the GPR according to the received allocation information (blocks 404 and 406). Each register in the GPR can be assigned as being a pGPR or a vGPR. In some instances, the streaming processor can generate two logical blocks (e.g., contiguous blocks) of registers, with the first logical block being pGPRs statically assigned to threads, and with the second logical block being vGPRs shared amongst the threads. As described above, the vGPRs can be separated into pools of vGPRs, and each thread can be assigned to a particular pool of vGPRs.

The streaming processor can additionally associate information with each thread (e.g., as instructions are received to the streaming processor, the streaming processor can identify a new thread, and associate information with the thread, for instance using context registers as described above), including (1) indications of pGPRs statically assigned to the thread, (2) one or more vGPRs, or a pool of vGPRs, that the thread can utilize, (3) information indicating whether the one or more vGPRs, or pool of vGPRs, are being used by a different thread (e.g., a vGPR valid bit), or any suitable combination thereof. For instance, the compiler can determine an assignment of pGPRs and vGPRs to each thread, and the streaming processor can maintain information indicating the assignments. Additionally, the vGPRs or a pool of vGPRs can be assigned upon each thread requiring use of vGPRs (e.g., for instance if the thread includes an arithmetic instruction), such that any vGPR or any pool of vGPRs can be assigned to any thread.

The streaming processor executes instructions for a particular thread (block 408). The streaming processor receives instructions, and the streaming processor (e.g., the thread scheduler), executes the instructions according to the allocated GPR.

For instance, the streaming processor can receive a first instruction from a thread associated with fetching information from memory (e.g., texture data), and the streaming processor can cause the fetched information to be stored in one or more pGPRs assigned to the thread.

As described above, the compiler can ensure that the operand included in the first instruction (e.g., an operand identifying a location to store the fetched information) is a pGPR address assigned to the thread. That is, the compiler can determine the allocation of the GPR (e.g., as illustrated in FIG. 1), and since the streaming processor can store information identifying pGPRs assigned to each thread (e.g., as described above with respect to blocks 404-406), the streaming processor can identify the operand included in the first instruction, and determine that the operand corresponds to a pGPR. The streaming processor can then execute the first instruction, and cause the fetched information to be stored in one or more pGPRs assigned to the thread. Additionally, the streaming processor (e.g., thread scheduler of the streaming processor) can ensure that the storing operand corresponds to a pGPR address assigned to the thread. For instance, the streaming processor can identify a type of the first instruction, and based on the type (e.g., memory operation), can ensure that the assigned pGPRs are utilized.

Similarly, if the first instruction is an arithmetic operation, the streaming processor can identify an operand included in the instruction (e.g., an address associated with a location in the GPR to store the computation result), and can determine that the operand corresponds to an assigned vGPR, or is included in a pool of vGPRs. The streaming processor can then identify whether the assigned vGPRs are being utilized by a different thread (e.g., the streaming processor can determine whether the vGPR valid bit is valid or invalid), and if the assigned vGPRs are not being utilized, can dynamically assign use of the vGPRs to the thread (e.g., toggle the vGPR valid bit on, and turn off vGPR valid bits of other threads assigned as using the same vGPRs, or pool of vGPRs). The thread can then be assigned use of the vGPRs until a stopping condition is detected (e.g., described in block 410). If the assigned vGPRs are being utilized by a different thread, the streaming processor can place the first instruction in a queue, and upon a stopping condition being detected for the different thread, can obtain and execute the first instruction (e.g., from the queue). While the description above, in some portions, describes a thread being assigned vGPRs, multitudes of threads can similarly be assigned respective vGPRs at a same time, that is the streaming processor can assign more than one thread their own vGPRs (e.g., simultaneously).

The streaming processor detects a stopping condition (block 410). As described above, with respect to block 408, the streaming processor can dynamically assign use of one or more vGPRs, or a pool of vGPRs, to a thread. The thread (e.g., a multitude of threads executing a same portion of code) can utilize the vGPRs until a stopping condition is detected. As described above, a stopping condition can include a barrier instruction, a SY bit, an end instruction, and so on. The streaming processor can then dynamically de-assign use of the vGPRs, and dynamically assign the vGPRs to a different thread (e.g., the streaming processor can obtain an instruction from a queue).

Figure 5:
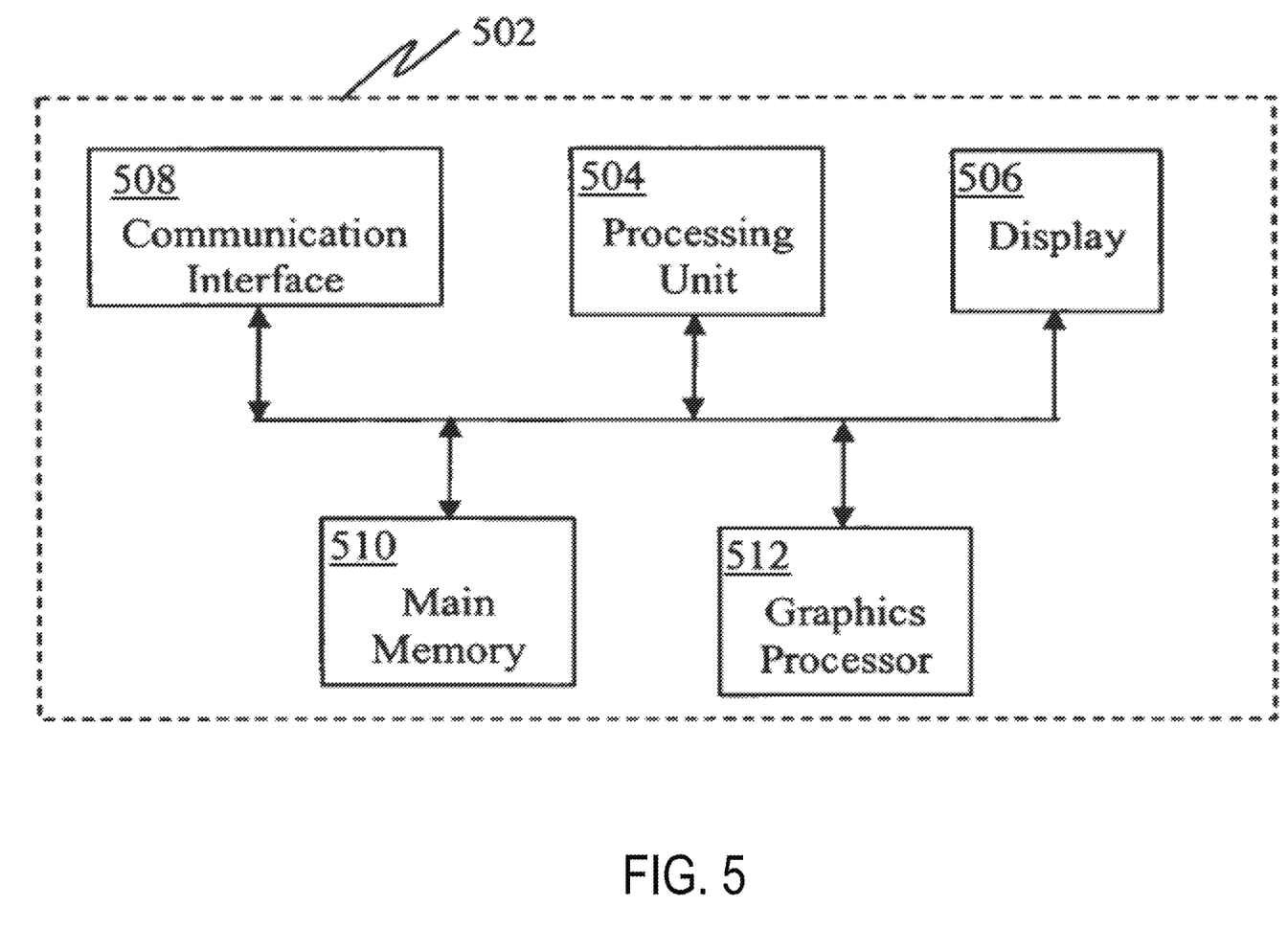
FIG. 5 is a block diagram illustrating a mobile device having a graphics processor with a multi-threaded streaming processor configured to operate according to implementations described herein.

FIG. 5 is a block diagram illustrating a mobile device 502 including a graphics processor 512 with a multi-threaded streaming processor configured to operate according to according to implementations described herein. Mobile device 502 may be a mobile telephone such as a smart phone, personal digital assistant, mobile video terminal, etc. A processing unit 504 is communicatively coupled to a main memory 510 and a display 506 that provides graphics, video, and other information to a user. A communication interface 508 serves to communicatively couple mobile device 502 to other communication devices via a wireless or wired medium. A graphics processor 512 may be used by processing unit 504 to process graphics data prior to sending it to the display 506. Graphics processor 512 includes a multi-threaded streaming processor configured to operate as described with reference to any of FIGS. 1, 2, 3 and/or 4. For instance, graphics processor 512 may include a multi-threaded streaming processor having general purpose registers (e.g., a group of general purpose registers, known as a GPR) which temporarily stores thread results. For a given process or application, a thread scheduler in the multi-threaded processor causes the GPR to be allocated according to allocation information received from a compiler (e.g., persistent general purpose registers and volatile general purpose registers, as described above).

Some of the embodiments described above have provided examples in connection with a graphics processing unit. The principles and advantages of the embodiments of technology discussed herein are operational with numerous general purpose or special purpose computing system environments or configurations. Examples of such computing systems, environments, and/or configurations that may be suitable for use with the technology described herein include, but are not limited to, personal computers, server computers, hand-held or laptop devices, tablet computers, multiprocessor systems, processor-based systems, programmable consumer electronics, network PCs, minicomputers, mainframe computers, distributed computing environments that include any of the above systems or devices, and the like.

Those of skill in the art will further appreciate that the various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with any suitable general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Moreover, a processor can have a single core or multiple cores. In addition, the processor may be any a special purpose processor such as a graphics processor.

In one or more example embodiments, the functions and methods described may be implemented in hardware, software, or firmware executed on a processor, or any combination thereof. If implemented in software, the functions may be stored on non-transitory computer-readable storage. By way of example, and not limitation, such non-transitory computer-readable storage can comprise RAM, ROM, EEPROM, CD-ROM or other optical disk storage, magnetic disk storage or other magnetic storage devices, or any other non-transitory medium that can be used to store desired program code in the form of instructions or data structures and that can be accessed by a computer. Moreover, it will be understood that the methods discussed herein are performed at least partly by physical circuitry. Accordingly, the claims are not intended to cover purely metal processes or abstract ideas. Indeed, the disclosed techniques are not applicable to mental steps, and are not performed within the human mind or by a human writing on a piece of paper.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled," "connected," and the like, as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to limit the invention to the precise form disclosed above. While specific embodiments of, and examples for, the invention are described above for illustrative purposes, For example, while processes or blocks are presented in a given order, alternative embodiments may perform routines having acts, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While certain embodiments have been described, these embodiments have been presented by way of example only, and are not intended to limit the scope of the disclosure. For example, various equivalent modifications are possible within the scope of the invention, as those skilled in the relevant art will recognize. Moreover, the elements and acts of the various embodiments described above can be combined to provide further embodiments. Indeed, the methods, systems, apparatus, and articles of manufacture described herein may be embodied in a variety of other forms; furthermore, various omissions, substitutions and changes in the form of the methods, systems, apparatus, and articles of manufacture described herein may be made without departing from the spirit of the disclosure.

We claim:

1. A streaming processor configured to execute a plurality of threads, the streaming processor comprising:
   general purpose registers included in a same memory of the streaming processor, the general purpose registers configured to store data associated with the plurality of threads, the general purpose registers comprising:
      a first type of registers, each of the first type of registers configured to store data for a dedicated thread of the plurality of threads; and
      a second type of registers configured to be allocated among the plurality of threads; and
   a thread scheduler configured to:
      receive a first instruction having a first latency and a second instruction having a second latency, the first latency and second latency being associated with execution of the respective first instruction and second instruction by the streaming processor, the first latency being above a threshold and the second latency being below the threshold;
      direct the streaming processor to store data associated with the first instruction to be stored in a general purpose register of the first type based on the first latency being above the threshold; and
      direct the streaming processor to store data associated with the second instruction to be stored in a general purpose register of the second type based on the second latency being below the threshold.

2. The streaming processor of claim 1, wherein the thread scheduler is further configured to receive allocation information indicating assignments of each of the general purpose registers as one of, the first type of registers or the second type of registers.

3. The streaming processor of claim 1, wherein the streaming processor is included in a graphics processing unit.

4. The streaming processor of claim 1, wherein the thread scheduler is configured to dynamically assign one or more second type of registers to a particular thread associated with the second instruction.

5. The streaming processor of claim 4, wherein the thread scheduler is further configured to de-assign, from the particular thread, the one or more second type of registers upon receipt of a stopping condition associated with the particular thread, the stopping condition including one or more of: a barrier instruction or an end instruction.

6. The streaming processor of claim 5, wherein the thread scheduler assigns one or more first type of registers to the particular thread prior to the associated stopping condition, and wherein the first type of registers are assigned to the particular thread subsequent to the associated stopping condition.

7. The apparatus of claim 1, wherein the first instruction includes a memory operation, and wherein the second instruction includes an arithmetic logic operations.

8. The streaming processor of claim 1, wherein respective operands specified in the instructions are indicative of latencies associated with the instructions.

9. The streaming processor of claim 1, wherein the thread scheduler is further configured to:
maintain context registers associated with each of the plurality of threads, the context registers for each thread storing (1) an indication of one or more first type of registers assigned to the thread, (2) an indication of one or more second type of registers that can be utilized by the thread.

10. The streaming processor of claim 9, wherein the context registers for each thread further store a valid bit, indicating whether the one or more second type of registers associated with the thread can be utilized by the thread, and wherein the thread scheduler is further configured to toggle the valid bit on or off depending on use of the one or more second type of registers.

11. The streaming processor of claim 1, wherein the first type of registers are assigned as a logical contiguous block in the general purpose registers, and wherein the second type of registers are assigned as a logical contiguous block in the general purpose registers.

12. The streaming processor of claim 11, wherein the second type of registers are separated into a plurality of pool of registers, and wherein the threads are assigned to respective pools of registers.

13. A method implemented by a streaming processor, the method comprising:
receiving information identifying an allocation of general purpose registers (GPR) included in a same memory of the streaming processor, the information indicating registers included in the GPR to be assigned as one of a first type of register or a second type of register;
allocating the GPR according to the received information;
receiving information identifying a plurality of threads to be executed by the streaming processor, and associating the information with a particular thread identifying assignments of (1) one or more of the first type of registers and (2) one or more of the second type of registers; and
executing instructions included in the particular thread, the instructions utilizing the assigned first and/or second types of registers based on respective execution latencies of the instructions, wherein instructions utilizing the assigned first type of registers are associated with execution latencies greater than a threshold, and wherein instructions utilizing the assigned second type of registers are associated with execution latencies less than the threshold.

14. The method of claim 13, wherein the information describing the allocation is generated using a compiler.

15. The method of claim 13, wherein each of the plurality of threads is statically assigned to one or more of the first type of registers, and at least two of the plurality of threads share use of the second type of registers.

16. The method of claim 13, further comprising:
assigning use of one or more of the second type of registers to a particular thread.

17. The method of claim 16, further comprising:
reassigning the one or more of the second type of registers to a different thread subsequent to said assigning and an occurrence of a stopping condition after said assigning.

18. The method of claim 13, further comprising:
assigning use of respective one or more of the second type of registers to two or more threads of the plurality of threads such that the respective one or more of the second type of registers are assigned concurrently.

19. The method of claim 17, wherein the stopping condition includes a barrier instruction or an end instruction.

20. The method of claim 13, wherein a quantity of the first type of registers allocated in the GPR is based, at least in part, on an amount of memory operations included in the plurality of threads.

21. The method of claim 13, wherein instructions utilizing the first type of registers include memory operations, and wherein instructions utilizing the second type of registers include arithmetic logic operations.

22. An apparatus comprising:
means for allocating general purpose registers (GPRs) included in a same memory of a streaming processor based on information received at an input of the streaming processor, the information indicative of execution latencies associated with instructions, the GPRs including registers assignable as persistent general purpose registers (pGPRs) or volatile general purpose registers (vGPRs); and
means for executing instructions included in a plurality of threads, the means for executing directing the streaming processor to store data associated with instructions of a plurality of threads in pGPRs or vGPRs,
wherein the streaming processor is directed to store data associated with one or more of the instructions in pGPRs based on the instructions having execution latencies greater than a threshold, and wherein the streaming processor is directed to store data associated with one or more of the instructions in vGPRs based on the instructions have execution latencies less than the threshold.

23. The apparatus of claim 22 configured as a graphics processor.

24. The apparatus of claim 22, further comprising:
means for receiving information identifying a plurality of threads to be executed by the streaming processor; and
means for associating information with each thread identifying assignments of
(1) one or more pGPRs, (2) one or more vGPRs.

25. A non-transitory computer-readable storage medium storing instructions that, when executed, cause one or more processors to:
receive a first instruction having a first latency and a second instruction having a second latency, the first latency and second latency being associated with execution of the respective first instruction and second instruction by a streaming processor, the first latency being above a threshold and the second latency being below the threshold;
direct the streaming processor to store data associated with the first instruction to be stored in a general purpose register of a first type based on the first latency being above the threshold; and
direct the streaming processor to store data associated with the second instruction to be stored in a general purpose register of a second type based on the second latency being below the threshold,
wherein the general purpose registers are included in a same memory of the streaming processor, each of the first type of registers is configured to store data for a dedicated thread of a plurality of threads, and the second type of registers is configured to be allocated among the plurality of threads.

26. The non-transitory computer-readable storage medium of claim 25, wherein the instructions further cause the one or more processors to receive allocation information indicating assignments of each of the general purpose registers as one of, the first type of registers or the second type of registers.

27. The non-transitory computer-readable storage medium of claim 25, wherein the streaming processor is included in a graphics processing unit.

28. The non-transitory computer-readable storage medium of claim 25, wherein the instructions further cause the one or more processors to dynamically assign one or more second type of registers to a particular thread associated with the second instruction.

29. The non-transitory computer-readable storage medium of claim 28, wherein the instructions further cause the one or more processors to de-assign, from the particular thread, the one or more second type of registers upon receipt of a stopping condition associated with the particular thread, the stopping condition including one or more of a barrier instruction or an end instruction.

30. The non-transitory computer-readable storage medium of claim 29, wherein the instructions further cause the one or more processors to assign one or more first type of registers to the particular thread prior to the associated stopping condition, and wherein the first type of registers are assigned to the particular thread subsequent to the associated stopping condition.

* * * * *